Patented Nov. 8, 1927.

1,648,761

UNITED STATES PATENT OFFICE.

FERDINAND DIETZSCH, OF KINGSTON-ON-THAMES, ENGLAND.

TREATMENT OF ORES FOR THE EXTRACTION OF VALUES.

No Drawing. Original application filed January 16, 1924, Serial No. 686,673, and in Peru January 27, 1923. Divided and this application filed August 10, 1925. Serial No. 49,446.

In my U. S. Patent No. 1,553,223, of September 8, 1925, (application filed January 16, 1924, Serial No. 686,673, of which the present application is a division), I have described a process of treating oxidized or roasted copper ores for extracting the copper in the form of a complex cuprous salt, and precipitating the copper by treatment with an oxidizing agent.

The treatment of an oxidized or roasted ore with a solution of a chloride and an acid is a common method of leaching out the values and a solution of sulphur dioxide being the cheapest acid where sulphur burners are practicable, sulphurous acid has been proposed as the acid to be used. It does not appear to have been noticed, however, that in the presence of a solution of high chlorine ion concentration sulphurous acid has a remarkably rapid action in converting into stable complex compounds those metals in an ore which are capable of such conversion.

My invention is based upon this behaviour of the chlorine ion and sulphurous acid and consists in a treatment of ores or concentrates containing copper and other metals which form complex compounds, namely manganese, cadmium, iron, cobalt, nickel, antimony, bismuth, copper, mercury, silver, gold, platinum or tungsten, with a solution of high chlorine ion concentration containing sulphurous acid sufficient in quantity to ensure the dissolution of the metal or metals to be extracted, the treatment being for the purpose either of recovering these metals or for removing them so that the residual ore can be treated with greater advantage for winning values.

The invention is particularly applicable to the treatment of cupriferous ores, or their concentrates, which are commonly known as oxidized ores, such as those containing oxides, sulphates, carbonates, silicates and oxychlorides, as well as the products obtained by the roasting of ores and concentrates containing cupriferous sulphides, sulpho-arsenide and sulpho-antimonide minerals.

The treatment consists in lixiviating the suitably crushed ores or their concentrates with a substantially saturated solution of an alkali chloride or an alkaline earth chloride, or another suitable metallic chloride, which has also been charged with sulphurous anhydride ($SO_2$). The most suitable and cheapest chloride is crude rock-salt or sodium chloride or a mixture of it with other alkali or metallic chlorides. Calcium chloride is also to be recommended. It is advisable that the chloride solution should be as nearly saturated as possible, as such a solution will produce complex salts of copper more readily than a less concentrated one, and a given quantity of such solution will dissolve in a given time much larger quantities of metal than will a less concentrated solution. The solvent solution may be allowed to pass through the ore by percolation, and for the purpose of this invention the ores or their concentrates can also be subjected to a preliminary soaking. It is, however, preferable to treat the ores by lixiviating them by percolation or by agitation with a saturated sodium chloride solution, which has been more or less charged with $SO_2$. Such a solution will contain, approximately, 26 per cent of sodium chloride and 5 to 10 per cent of $SO_2$.

The dissolution of the oxidized copper minerals is undoubtedly effected by the sulphurous acid absorbed in the saturated chloride solution and is not due to free sulphuric or hydrochloric acids generated during the treatment, for the solution freed from copper even after weeks of repeated use and after expelling the excess sulphurous acid by heat is found to be neutral and needs to be charged again with $SO_2$ before re-using it as solvent. The copper minerals dissolve as a cupro-cupric complex, which is an unstable and rather dissociated salt. The nature of this complex can be studied in an aqueous or less concentrated chloride solution, but not in a saturated solution, in which it ceases to exist, for in the presence of a more or less saturated chloride solution it is converted into a cuprous chloride complex.

Undeniably the copper is finally obtained in a solution which gives the characteristic reactions of a fairly stable and less dissociated complex than the first or cupro-cupric complex.

It is well known that catalytic agents intervene in the formation of true complex compounds, as distinct from double salts. The saturated chloride solution in this case probably acts as a catalytic agent in bringing about the conversion of the more dissociated cupro-cupric complex into the less ionized cuprous chloride complex and this will also account for the extreme rapidity and completeness with which, even in the cold, the copper values are dissolved.

The concentration of the sulphurous acid in the chloride solution, provided sufficient is added to dissolve the total copper contents of the ore, does not appear to influence the thoroughness of the dissolution of the copper, but rather the rapidity of the reaction.

In common with many complex salts formed by the intervention of saturated solutions, the cuprous chloride complex in a solution nearly saturated with it, will instantaneously break up on the addition of water, precipitating white cuprous chloride. Dilution with water has no effect on less highly charged solutions of the cuprous complex.

It is known that usually small quantities of complex compounds suffice to saturate a solution, and for that reason larger quantities of solvent solution are required to complete the leaching of ores than are needed in the treatment by acids. Tests have shown that sufficient quantities of fresh solution brought into contact with the ore by percolation or agitation are more important than the actual time allowed for them to remain in contact.

A saturated solution of sodium chloride, which has likewise been saturated with $SO_2$, when in contact with an excess of cupric oxide will become saturated by taking up 62.4 grams of copper per litre of solution, or 29 cubic feet of solution will extract more or less completely the copper from one ton of ore assaying 5.2 per cent Cu., provided sufficient washes are applied to recover the dissolved values.

It is, however, not advisable to produce solutions even approximately saturated with the cuprous chloride complex, for in that case water washes could not be applied to the treated ore containing them, as this would cause cuprous chloride to be precipitated and to be lost in the ore. In such a case the highly charged solutions would require to be diluted by the addition of saturated chloride solution, or the ore washed with such saturated solution, before finally washing the ores with water.

The copper complex salt in solution is readily and completely precipitated on iron, or as a sulphide by $H_2S$ or $Na_2S$, or a calcium polysulphide.

The following example illustrates this part of the invention—

An ore assaying 5.2 per cent Cu., which consisted of a mixture mostly of silicates with some carbonates of copper in an andesite gangue, and containing some free lime, was crushed to pass through a No. 15 mesh sieve. The quantity thus prepared was placed in a tub provided with a filter-bottom and was then leached with four times its weight of a saturated sodium chloride solution, which had also been saturated with $SO_2$. The percolation of the solution was checked by means of a press cock, so that it took 24 hours to pass the solution through the ore. The ore was next washed by percolating water through it. The leached and washed residue was found to contain 0.66 per cent of Cu., showing that an extraction of 87.33 per cent had been obtained. The solution produced without the wash-water was found to contain 0.19 per cent of total sulphates, which in addition to the sodium sulphate probably formed during the reaction, also included sulphates which may have been present in the ore and in the commercial sodium chloride. This low content of total sulphates clearly proves that the copper was not dissolved by the action of any appreciable quantity of free sulphuric acid formed by the oxidation of the $SO_2$ by oxygen in the ore or in contact with the air.

The copper in the solution was completely recovered by precipitation with $Na_2S$. By carefully avoiding an excess of $Na_2S$, the solution freed from copper, after bringing its sodium chloride strength to the saturation point and by re-saturating it with $SO_2$ can be used again for lixiviating ores.

Instead of treating the coarsely crushed ore by percolating through it a saturated chloride solution which has also been saturated with sulphur dioxide, the ore may be crushed finer and, suspended in a saturated chloride solution, may be agitated with a mixture of compressed air and sulphur dioxide, or the ore, suspended in the saturated chloride solution, may be mechanically agitated while the requisite sulphur dioxide is being charged into the mixture.

The same methods can be adopted for the treatment of oxidized cupriferous gold and silver ores for the removal of the copper contents, as a preparation for their subsequent treatment with cyanide. In treating such ores the excessive consumption of cyanide caused by the copper minerals often proves to be prohibitive.

In a general way this method lends itself to the removal or destruction of cyanicides even other than those of the copper minerals, especially those of manganese. After a preparation in the manner described such ores can be cheaply cyanided.

The following example illustrates the method. A cupriferous gold-silver ore consisting of a mixture of oxides, carbonates and silicates of copper together with sulphides of silver and copper and free gold and silver, which assayed 13.43 per cent of copper, 102.14 grams of silver and 37.86 grams of gold per metric ton, was crushed through a No. 20 mesh sieve. A quantity of the ore was first treated with a cyanide solution for the extraction of the gold and silver values, but in spite of all the usual remedies applied, the consumption of cyanide was extremely high, viz 5.65 kilos per ton of ore. Another quantity of the ore was next leached for the preliminary extraction of the oxidized copper minerals with eight times its weight of a saturated solution of sodium chloride which had been saturated with $SO_2$. After giving the ore an alkaline wash, it was next treated with a cyanide solution.

The following extractions were obtained: 51.20 per cent of the total copper and 61.43 per cent of the gold and silver values. The consumption of the cyanide now proved to be better, namely 1.7 kilos per ton of ore.

Another quantity of the ore was subjected to a roast to eliminate the sulphur from the sulphides and was next leached with eight times its weight of a saturated solution of chloride of sodium, which had been saturated with $SO_2$. After giving the ore an alkaline wash, it was treated with cyanide. The extractions in this case were 89.10 per cent of copper and 82.60 per cent of gold and silver values, with a consumption of even less cyanide, viz, 0.95 kilo per ton of ore.

In the case of argentiferous copper ores a saturated common salt solution more or less charged with $SO_2$ dissolved considerable proportions of the silver values in addition to those of copper. For instance, in the case of a certain oxidized argentiferous copper ore this extraction of silver amounted to 60.87 per cent of the total silver contents, which was obtained by the same leaching which removed 88.89 per cent of the total copper values. This clearly demonstates the fact that there was chlorination of some of the silver minerals, for only the chloride of silver is soluble in a saturated common salt solution.

Very low grade silver ores, needing the cheapest possible treatment, will yield very fair extractions without any additional solvent, by simply leaching them with a saturated common salt solution which has been saturated with sulphurous acid.

Partly oxidized gold and silver ores containing considerable admixtures of base metal oxides, which ores have not been chloridized by roasting to avoid volatilization losses, or refractory ores ordinarily roasted, as well as natural oxidized ores that contain little or no sulphides, may be more or less chloridized in the wet way by the following method, and in that manner the base metal oxides can be made soluble by converting them into chlorides, and then removing them by leaching.

The suitably crushed ore is mixed with an oxidizing agent, of which a few pounds per ton generally suffice, preferably with a permanganate or manganese dioxide and then treated with a saturated alkali chloride solution which has also been saturated with sulphurous anhydride. This solution chloridizes the metallic oxides present. The reactions occur in the cold but are very much accelerated by raising the temperature.

Small proportions of alkali nitrates instead of the manganese compound produces similar, but not such pronounced effects, while a solution of bleaching powder with sulphurous acid yields good results.

The chloridizing solution is allowed to percolate for some time through the crushed ore, and after a wash with water to remove any sulphurous acid, chlorine, acid sulphate of sodium, manganic chloride and other base metal chlorides, the ores are ready to be leached with the usual solvent solutions of the cyanides and the thiosulphates for the recovery of the remaining gold and silver values.

In the case of argentiferous ores the saturated chloride solution will be found likewise to have dissolved considerable quantities of silver proving that some of the silver has been converted into chloride. The silver chloride contained in the saturated chloride solution can be recovered by precipitation on copper, or by diluting the solution with water the silver chloride can be deposited on wood shavings.

In a measure the dissolving effect of the saturated chloride solution on the silver relieves the work to be done by the subsequently applied solvent solutions, but as this involves a double precipitation, it is frequently preferable to reduce the strength of the chloride solution, so that it may not dissolve any silver values.

The removal by this method of the base metal oxides that consume cyanide and thiosulphate makes it possible to leach economically ores which could not otherwise be profitably treated. It has been ascertained that the total extraction of the silver contents of an ore is also considerably increased by this method.

When the oxidizing agent used is chlorine the chloride solution containing sulphurous acid constitutes a useful agent for chloridizing gold and silver ores for extraction of metal values. Thus a concentrated salt solution may be more or less saturated with chlorine and sulphur dioxide and used as a liquor for leaching the ore.

Having thus fully described the nature of the said invention and the best means I know of carrying the same into practical effect, I claim :—

1. A process of treating oxidized or roasted copper ores for extracting metal values therefrom, which process consists in treating the ore with a substantially saturated solution of a metallic chloride containing sulphurous acid in quantity sufficient to produce a solution containing copper in the cuprous state, separating from the residual ore the solution still containing free sulphurous acid so produced, and precipitating copper values from the solution while it still contains free sulphurous acid.

2. A process of treating oxidized or roasted copper ores for extracting metal values therefrom, which process consists in treating the ore with a substantially saturated solution of an alkali chloride containing sulphurous acid in quantity sufficient to produce a solution containing copper in the cuprous state, separating from the residual ore the solution still containing free sulphurous acid so produced, and precipitating copper values from the solution while it still contains free sulphurous acid.

3. A process of treating oxidized or roasted copper ores for extracting metal values therefrom, which process consists in treating the ore with a solution of high chlorine ion concentration substantially saturated with sulphurous acid to produce a solution containing copper in the cuprous state, separating from the residual ore the solution still containing the free sulphurous acid so produced and precipitating copper vaules from the said solution whilst it still contains free sulphurous acid.

4. A process of treating oxidized or roasted copper ores for extracting metal values therefrom, which process consists in treating the ore with a substantially saturated solution of a metallic chloride substantially saturated with sulphurous acid to produce a solution containing copper in the cuprous state, separating from the residual ore the solution still containing free sulphurous acid so produced, and precipitating metallic values from the said solution whilst it still contains free sulphurous acid.

5. A process of treating oxidized or roasted copper ores for extracting metal values therefrom, which process consists in treating the ore with a substantially saturated solution of an alkali chloride substantially saturated with sulphurous acid to produce a solution containing copper in the cuprous state, separating from the residual ore the solution still containing free sulphurous acid so produced, and precipitating copper values from said solution whilst it still contains free sulphurous acid.

6. A process of treating oxidized or roasted copper ores for extracting metal values therefrom, which process consists in treating the ore with a substantially saturated solution of a metallic chloride, saturating the solution with sulphurous acid while it is in contact with the ore, separating from the residual ore the solution so produced, containing copper in the cuprous state and containing free sulphurous acid, and precipitating copper values from the said solution whilst it still contains free sulphurous acid.

7. A process of treating oxidized or roasted copper ores for extracting metal values therefrom, which process consists in treating the ore with a substantially saturated solution of an alkali chloride, saturating the solution with sulphurous acid while it is in contact with the ore, separating from the residual ore the solution so produced, containing copper in the cuprous state and containing free sulphurous acid, and precipitating copper values from the said solution whilst it still contains free sulphurous acid.

8. A process of treating oxidized or roasted copper ores for extracting metal values therefrom, which process consists in treating the ore with a solution of high chlorine ion concentration containing sulphurous acid in quantity sufficient to produce a solution containing copper in the cuprous state, separating from the residual ore the solution still containing free sulphurous acid so produced, and precipitating copper values from the said solution whilst it still contains free sulphurous acid.

9. A process of treating oxidized or roasted copper ores for extracting metal values therefrom, which process consists in treating the ore with a solution of high chlorine ion concentration, saturating the solution with sulphurous acid whilst it is in contact with the ore, separating from the residual ore the solution so produced, containing copper in the cuprous state and containing free sulphurous acid, and precipitating copper values from the said solution whilst it still contains free sulphurous acid.

10. A process of treating oxidized or roasted copper ores for extracting metal values therefrom, which process consists in treating the ore with a substantially saturated solution of a metallic chloride containing sulphurous acid in quantity sufficient to produce a solution containing copper in the cuprous state, separating from the residual ore the solution still containing free sulphurous acid so produced, precipitating copper values from the said solution whilst it still contains free sulphurous acid, separating the precipitated copper values, re-saturating the solution with metallic chloride and using it to treat a further quantity of ore for the extraction of copper values.

11. A process of treating oxidized or roasted copper ores for extracting metal values therefrom, which process consists in treating the ore with a substantially saturated solution of an alkali chloride containing sulphurous acid in quantity sufficient to produce a solution containing copper in the cuprous state, separating from the residual ore the solution still containing free sulphurous acid so produced, precipitating copper values from the said solution, whilst it still contains free sulphurous acid, separating the precipitated copper values, re-saturating the solution with alkali chloride and using it to treat a further quantity of ore for the extraction of copper values.

12. A process of treating oxidized or roasted copper ores for extracting metal values therefrom, which process consists in treating the ore with a substantially saturated solution of a metallic chloride substantially saturated with sulphurous acid to produce a solution containing cooper in the cuprous state, separating from the residual ore the solution still containing free sulphurous acid so produced, precipitating copper values from the said solution whilst it still contains free sulphurous acid, separating the precipitated copper values, re-saturating the solution with metallic chloride, and using it to treat a further quantity of ore for the extraction of copper values.

13. A process of treating oxidized or roasted copper ores for extracting metal values therefrom, which process consists in treating the ore with a substantially saturated solution of an alkali chloride substantially saturated with sulphurous acid to produce a solution containing copper in the cuprous state, separating from the residual ore the solution still containing free sulphurous acid so produced, precipitating copper values from the said solution whilst it still contains free sulphurous acid, separating the precipitated copper values, re-saturating the solution with alkali chloride and using it to treat a further quantity of ore for the extraction of copper values.

14. A process of treating oxidized or roasted copper ores for extracting metal values therefrom, which process consists in treating the ore with a substantially saturated solution of a metallic chloride, saturating the solution with sulphurous acid whilst it is in contact with the ore, separating from the residual ore the solution so produced, containing copper in the cuprous state and containing free sulphurous acid, precipitating copper values from the said solution whilst it still contains free sulphurous acid, separating the precipitated copper values, re-saturating the solution with metallic chloride and using it to treat a further quantity of ore for the extraction of copper values.

15. A process of treating oxidized or roasted copper ores for extracting metal values therefrom, which process consists in treating the ore with a substantially saturated solution of an alkali chloride, saturating the solution with sulphurous acid whilst it is in contact with the ore, separating from the residual ore the solution so produced, containing copper in the cuprous state and containing free sulphurous acid, precipitating copper values from the said solution whilst it still contains free sulphurous acid, separating the precipitated copper values, re-saturating the solution with alkali chloride and using it to treat a further quantity of ore for the extraction of copper values.

16. A process of treating oxidized or roasted copper ores for extracting metal values therefrom, which process consists in treating the ore with a substantially saturated solution of a metallic chloride substantially saturated with sulphurous acid to produce a solution containing copper in the cuprous state, separating from the residual ore the solution still containing free sulphurous acid so produced, precipitating copper values from the said solution whilst it still contains free sulphurous acid, separating the precipitated copper values, re-saturating the solution with metallic chloride and with sulphurous acid, and using it to treat a further quantity of ore for the extraction of copper values.

17. A process of treating oxidized or roasted copper ores for extracting metal values therefrom, which process consists in treating the ore with a substantially saturated solution of an alkali chloride substantially saturated with sulphurous acid to produce a solution containing copper in the cuprous state, separating from the residual ore the solution still containing free sulphurous acid so produced, precipitating copper values from the said solution whilst it still contains free sulphurous acid, separating the precipitated copper values, re-saturating the solution with alkali chloride and with sulphurous acid, and using it to treat a further quantity of ore for the extraction of copper values.

In testimony whereof I have signed my name to this specification.

FERDINAND DIETZSCH.